United States Patent
Harel et al.

(10) Patent No.: US 8,644,413 B2
(45) Date of Patent: Feb. 4, 2014

(54) IMPLEMENTING BLIND TUNING IN HYBRID MIMO RF BEAMFORMING SYSTEMS

(71) Applicant: Magnolia Broadband Inc., Warren, NJ (US)

(72) Inventors: Haim Harel, New York, NY (US); Eduardo Abreu, Allentown, PA (US); Kenneth Kludt, San Jose, CA (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 13/770,255

(22) Filed: Feb. 19, 2013

(65) Prior Publication Data

US 2013/0322509 A1    Dec. 5, 2013

Related U.S. Application Data

(63) Continuation-in-part of application No. 13/630,146, filed on Sep. 28, 2012.

(60) Provisional application No. 61/652,743, filed on May 29, 2012, provisional application No. 61/657,999, filed on Jun. 11, 2012, provisional application No. 61/665,592, filed on Jun. 28, 2012, provisional application No. 61/658,015, filed on Jun. 11, 2012, provisional application No. 61/671,408, filed on Jul. 13, 2012.

(51) Int. Cl.
    *H04B 7/02* (2006.01)
(52) U.S. Cl.
    USPC .......................... 375/267; 375/227; 375/316
(58) Field of Classification Search
    USPC ................. 375/227, 316, 267; 455/562.1, 77; 370/329
    See application file for complete search history.

(56) References Cited

U.S. PATENT DOCUMENTS

| 5,915,215 A | 6/1999 | Williams et al. |
| 6,046,655 A | 4/2000 | Cipolla |

(Continued)

FOREIGN PATENT DOCUMENTS

| EP | 1 867 177 | 5/2010 |
| EP | 2 234 355 | 9/2010 |

(Continued)

OTHER PUBLICATIONS

Office Action issued by the United States Patent and Trademark Office for U.S. Appl. No. 13/630,146 dated Jan. 22, 2013.

(Continued)

*Primary Examiner* — Daniel Washburn
*Assistant Examiner* — Fitwi Hailegiorgis
(74) *Attorney, Agent, or Firm* — Pearl Cohen Zedek Latzer Baratz LLP

(57) ABSTRACT

A system and a method for applying a blind tuning process to M antennas coupled via N beamformers to a multiple input multiple output (MIMO) receiving system having N channels, wherein M>N, are provided herein. The method includes the following steps: Periodically measuring channel fading rate at a baseband level to determine the number of antennas L out of K antennas connected to each one of the beamformers, to be combined at each one of the N beamformers; assigning the antennas to the subset L according to some criteria such as best quality indicator; repeatedly applying a tuning process to L antennas in each one of the N beamformers.

14 Claims, 10 Drawing Sheets

(56) References Cited

U.S. PATENT DOCUMENTS

| | | |
|---|---|---|
| 6,226,507 B1 | 5/2001 | Ramesh et al. |
| 6,321,077 B1 | 11/2001 | Saitoh et al. |
| 6,377,783 B1 | 4/2002 | Lo et al. |
| 6,927,646 B2 | 8/2005 | Niemi |
| 6,987,958 B1 | 1/2006 | Lo et al. |
| 7,257,425 B2 | 8/2007 | Wang et al. |
| 7,299,072 B2 | 11/2007 | Ninomiya |
| 7,499,109 B2 | 3/2009 | Kim et al. |
| 7,742,000 B2 | 6/2010 | Mohamadi |
| 7,769,107 B2 | 8/2010 | Sandhu et al. |
| 7,898,478 B2 | 3/2011 | Niu et al. |
| 8,155,613 B2 | 4/2012 | Kent et al. |
| 8,294,625 B2 | 10/2012 | Kittinger et al. |
| 8,306,012 B2 | 11/2012 | Lindoff et al. |
| 8,369,436 B2 | 2/2013 | Stirling-Gallacher |
| 8,509,190 B2 | 8/2013 | Rofougaran |
| 8,520,657 B2 | 8/2013 | Rofougaran |
| 2004/0125900 A1 | 7/2004 | Liu et al. |
| 2005/0129155 A1 | 6/2005 | Hoshino |
| 2005/0245224 A1 | 11/2005 | Kurioka |
| 2005/0287962 A1 | 12/2005 | Mehta et al. |
| 2006/0135097 A1 | 6/2006 | Wang et al. |
| 2006/0264184 A1 | 11/2006 | Li et al. |
| 2006/0270343 A1 | 11/2006 | Cha et al. |
| 2006/0285507 A1 | 12/2006 | Kinder et al. |
| 2007/0223380 A1 | 9/2007 | Gilbert et al. |
| 2008/0051037 A1 | 2/2008 | Molnar et al. |
| 2008/0144737 A1 | 6/2008 | Naguib |
| 2008/0238808 A1 | 10/2008 | Arita et al. |
| 2008/0280571 A1* | 11/2008 | Rofougaran et al. ............ 455/77 |
| 2009/0028225 A1 | 1/2009 | Runyon et al. |
| 2009/0046638 A1* | 2/2009 | Rappaport et al. ............ 370/329 |
| 2009/0058724 A1 | 3/2009 | Xia et al. |
| 2009/0121935 A1 | 5/2009 | Xia et al. |
| 2009/0190541 A1 | 7/2009 | Abedi |
| 2009/0268616 A1 | 10/2009 | Hosomi |
| 2009/0322613 A1 | 12/2009 | Bala et al. |
| 2010/0040369 A1 | 2/2010 | Zhao et al. |
| 2010/0172429 A1 | 7/2010 | Nagahama et al. |
| 2010/0195560 A1 | 8/2010 | Nozaki et al. |
| 2010/0234071 A1* | 9/2010 | Shabtay et al. ............ 455/562.1 |
| 2010/0285752 A1 | 11/2010 | Lakshmanan et al. |
| 2010/0316043 A1 | 12/2010 | Doi et al. |
| 2011/0032972 A1 | 2/2011 | Wang et al. |
| 2011/0150050 A1 | 6/2011 | Trigui et al. |
| 2011/0205883 A1 | 8/2011 | Mihota |
| 2011/0249576 A1 | 10/2011 | Chrisikos et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2012/0014377 A1 | 1/2012 | Joergensen et al. |
| 2012/0020396 A1 | 1/2012 | Hohne et al. |
| 2012/0033761 A1 | 2/2012 | Guo et al. |
| 2012/0034952 A1 | 2/2012 | Lo et al. |
| 2012/0064838 A1 | 3/2012 | Miao et al. |
| 2012/0230380 A1 | 9/2012 | Keusgen et al. |
| 2013/0079048 A1 | 3/2013 | Cai et al. |
| 2013/0170388 A1 | 7/2013 | Ito et al. |
| 2013/0208619 A1 | 8/2013 | Kudo et al. |
| 2013/0223400 A1 | 8/2013 | Seo et al. |
| 2013/0242976 A1 | 9/2013 | Katayama et al. |

FOREIGN PATENT DOCUMENTS

| | | |
|---|---|---|
| WO | WO 03/047033 | 6/2003 |
| WO | WO 03/073645 | 9/2003 |
| WO | WO 2010/085854 | 8/2010 |
| WO | WO 2011/060058 | 5/2011 |

OTHER PUBLICATIONS

Office Action issued by the United States Patent and Trademark Office for U.S. Appl. No. 13/630,146 dated Mar. 27, 2013.

Office Action issued by the United States Patent and Trademark Office for U.S. Appl. No. 13/762,159 dated Apr. 16, 2013.

Office Action issued by the United States Patent and Trademark Office for U.S. Appl. No. 13/762,191 dated May 2, 2013.

Office Action issued by the United States Patent and Trademark Office for U.S. Appl. No. 13/762,188 dated May 15, 2013.

Office Action issued by the United States Patent and Trademark Office for U.S. Appl. No. 13/776,204 dated May 21, 2013.

Office Action issued by the United States Patent and Trademark Office for U.S. Appl. No. 13/776,068 dated Jun. 11, 2013.

Notice of Allowance issued by the United States Patent and Trademark Office for U.S. Appl. No. 13/762,159 dated Jun. 20, 2013.

Office Action issued by the United States Patent and Trademark Office for U.S. Appl. No. 13/775,886 dated Jul. 17, 2013.

Notice of Allowance issued by the United States Patent and Trademark Office for U.S. Appl. No. 13/762,191 dated Jul. 19, 2013.

Notice of Allowance issued by the United States Patent and Trademark Office for U.S. Appl. No. 13/630,146 dated Jul. 31, 2013.

Notice of Allowance issued by the United States Patent and Trademark Office for U.S. Appl. No. 13/762,188 dated Aug. 19, 2013.

Partial International Search Report for International Application No. PCT/US2013/043056 dated Sep. 5, 2013.

Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.

Office Action issued by the United States Patent and Trademark Office for U.S. Appl. No. 13/889,150 dated Sep. 25, 2013.

Office Action issued by the United States Patent and Trademark Office for U.S. Appl. No. 13/955,320 dated Oct. 15, 2013.

Office Action issued by the United States Patent and Trademark Office for U.S. Appl. No. 13/776,204 dated Oct. 23, 2013.

Office Action issued by the United States Patent and Trademark Office for U.S. Appl. No. 13/925,454 dated Oct. 28, 2013.

Office Action issued by the United States Patent and Trademark Office for U.S. Appl. No. 13/955,194 dated Oct. 30, 2013.

Office Action issued by the United States Patent and Trademark Office for U.S. Appl. No. 14/013,190 dated Nov. 5, 2013.

Office Action issued by the United States Patent and Trademark Office for U.S. Appl. No. 13/776,068 dated Nov. 5, 2013.

* cited by examiner

```
                                    1000
                   ┌──────────────────────────────────────────────────┐
                   │  RECEIVING MULTIPLE INPUT MULTIPLE OUTPUT (MIMO)  │
           1010 ───│  RADIO FREQUENCY (RF) SIGNALS THROUGH M ANTENNAS │
                   │  COUPLED VIA N BEAMFORMERS TO A MIMO RECEIVING   │
                   │  SYSTEM HAVING N CHANNELS, WHEREIN M>N           │
                   └──────────────────────────────────────────────────┘
                                          │
                   ┌──────────────────────────────────────────────────┐
           1020 ───│     MEASURING CHANNEL FADING RATE AT A BASEBAND LEVEL     │
                   └──────────────────────────────────────────────────┘
                                          │
                   ┌──────────────────────────────────────────────────┐
                   │  DETERMINING A NUMBER OF ANTENNAS L TO BE COMB-  │
           1030 ───│  INED OUT OF K ANTENNAS OF EACH ONE OF THE N     │
                   │  BEAMFORMERS, BASED ON THE MEASURED FADING RATE  │
                   └──────────────────────────────────────────────────┘
                                          │
                   ┌──────────────────────────────────────────────────┐
           1040 ───│       REPEATEDLY APPLYING A TUNING PROCESS       │
                   │       TO L ANTENNAS AT EACH OF THE N BEAMFORMERS │
                   └──────────────────────────────────────────────────┘
```

Figure 10

IMPLEMENTING BLIND TUNING IN HYBRID MIMO RF BEAMFORMING SYSTEMS

CROSS-REFERENCE TO RELATED APPLICATIONS

The present application is a continuation-in-part application of U.S. non-provisional patent application Ser. No. 13/630,146 filed on Sep. 28, 2012, which in turn claims benefit from U.S. provisional patent application 61/652,743 filed on May 29, 2012; 61/657,999 filed on Jun. 11, 2012; and 61/665,592 filed on Jun. 28, 2012 and the present application further claims benefit from U.S. provisional patent application 61/658,015 filed on Jun. 11, 2012; and 61/671,408 filed on Jul. 13, 2012, all of which are incorporated herein in their entirety.

FIELD OF THE INVENTION

The present invention relates generally to the field of radio frequency (RF) multiple-input-multiple-output (MIMO) systems and in particular to systems and methods for improving performance of MIMO systems by RF beamforming.

BACKGROUND OF THE INVENTION

Prior to setting forth a short discussion of the related art, it may be helpful to set forth definitions of certain terms that will be used hereinafter.

The term "MIMO" as used herein, is defined as the use of multiple antennas at both the transmitter and receiver to improve communication performance. MIMO offers significant increases in data throughput and link range without additional bandwidth or increased transmit power. It achieves this goal by spreading the transmit power over the antennas to achieve spatial multiplexing that improves the spectral efficiency (more bits per second per Hz of bandwidth) or to achieve a diversity gain that improves the link reliability (reduced fading), or increased antenna directivity.

The term "beamforming" sometimes referred to as "spatial filtering" as used herein, is a signal processing technique used in antenna arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity.

The term "beamformer" as used herein refers to RF circuitry that implements beamforming and usually includes a combiner and may further include switches, controllable phase shifters, and in some cases amplifiers and/or attenuators.

The term "Receiving Radio Distribution Network" or "Rx RDN" or simply "RDN" as used herein is defined as a group of beamformers as set forth above.

The term "hybrid MIMO RDN" as used herein is defined as a MIMO system that employs two or more antennas per channel (N is the number of channels and M is the total number of antennas and M>N). This architecture employs a beamformer for each channel so that two or more antennas are combined for each radio circuit that is connected to each one of the channels.

In hybrid MIMO RDN receiving systems, when the phases of the received signals from each antenna are properly adjusted or tuned with respect to one another, the individual signals may be combined and may result in an improved SNR or data throughput for the receiving system.

One tuning phase method is based on channel estimation of each antenna which contributes to the beamforming; the invention here is using a different method for identifying best-phase alignments for beamforming purposes; it is based on modifying phases iteratively while monitoring their combined signal quality.

When more than two antennas are involved, the number of iteration increases, thus longer periods of quasi-static fading are needed for stable process, as well as mechanism to address cases where quasi-static fading ceases to exist.

For example, in Cellular protocols, quality indicators are typically repeated ~1000-2000 times per second. In WiFi protocols, they may have lower repetition rates, depending on traffic and number of users. In Mobile environment, fading change rate may vary between ~10 times a second (static environment) and 100-200 times a second (vehicular), although it can be as fast as 1000-2000 times per second.

Consequently, when multiple antennas beamforming is based on an iterative process, it has to strike a balance between using the maximum number of available antennas, and the need to update each one of them fast enough to trace the fading variations.

As discussed above, various methods are known in the art for tuning of multiple-antenna beamformers. Each method has its advantages and disadvantages. One method is based on making a direct measurement of the antennas' signals phases & amplitudes and calculates corresponding corrections (can be carried out via channel estimation). Another method includes trying out various possible solutions and grading them per their impact on various quality indicators. This can be carried out via blind search of the best set of phases where there is a systematic gradient seeking method, or via blind scan where there is preference to try each and every possible phase value, or some other method where trial and error are the driver of the tuning process. All of these trial and error methods, including blind scan and blind search, are referred herein as "blind beamforming tuning algorithms" or simply: "blind algorithms".

It is generally agreed that while channel estimation based method is the faster tuning method, it is not always the preferred one. For instance, in some cases, channel estimation requires digging info that may not be provided over standard signals coming out of baseband processors, while quality indicators needed for blind search may be readily available. Another consideration relates to dealing with interference—where co-channel undesired signals dominate, and when the receiver does not allocate resources for interference cancellation, then blind scan may yield better results (e.g., maximize the overall data rates).

SUMMARY

The present invention, in embodiments thereof, addresses the challenge deriving from the fact that blind algorithms with multiple antennas require relatively long convergence time. Embodiments of the present invention continuously update the beamforming process based on the fading environment. More specifically, by applying trade-offs among the participating antennas, algorithm resolution, and algorithm stability, embodiments of the present invention provide means for exploiting the available tools that can still be used without causing the algorithm to lose track. Therefore, a robust convergence metric is employed.

According to some embodiments of the present invention, a system for selecting a subset of L antennas from K antennas in each beamformer out of N beamformers is provided herein. The system includes a multiple-input-multiple-output (MIMO) receiving system comprising a MIMO baseband module having N branches; a radio distribution network (RDN) connected to the MIMO receiving system, the RDN comprising at least one beamformer, wherein each one of the beamformers is fed by two or more antennas, so that a total number of antennas in the system is M, wherein M is greater than N, wherein each one of the beamformers includes at least one combiner configured to combine signals coming from the antennas coupled to a respective beamformer into a combined signal, wherein the baseband module comprises an antenna subset selection module configured to: derive Mobility Monitoring Indicators (MMI) associated with the MIMO receiving system, and use a look up table to map MMI for each of the L antennas in each beamformer. Then the L antennas are each tuned over time using blind search/scan.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

FIG. 10 is a high level flowchart illustrating a method according to some embodiment of the present invention.

Figure 1:
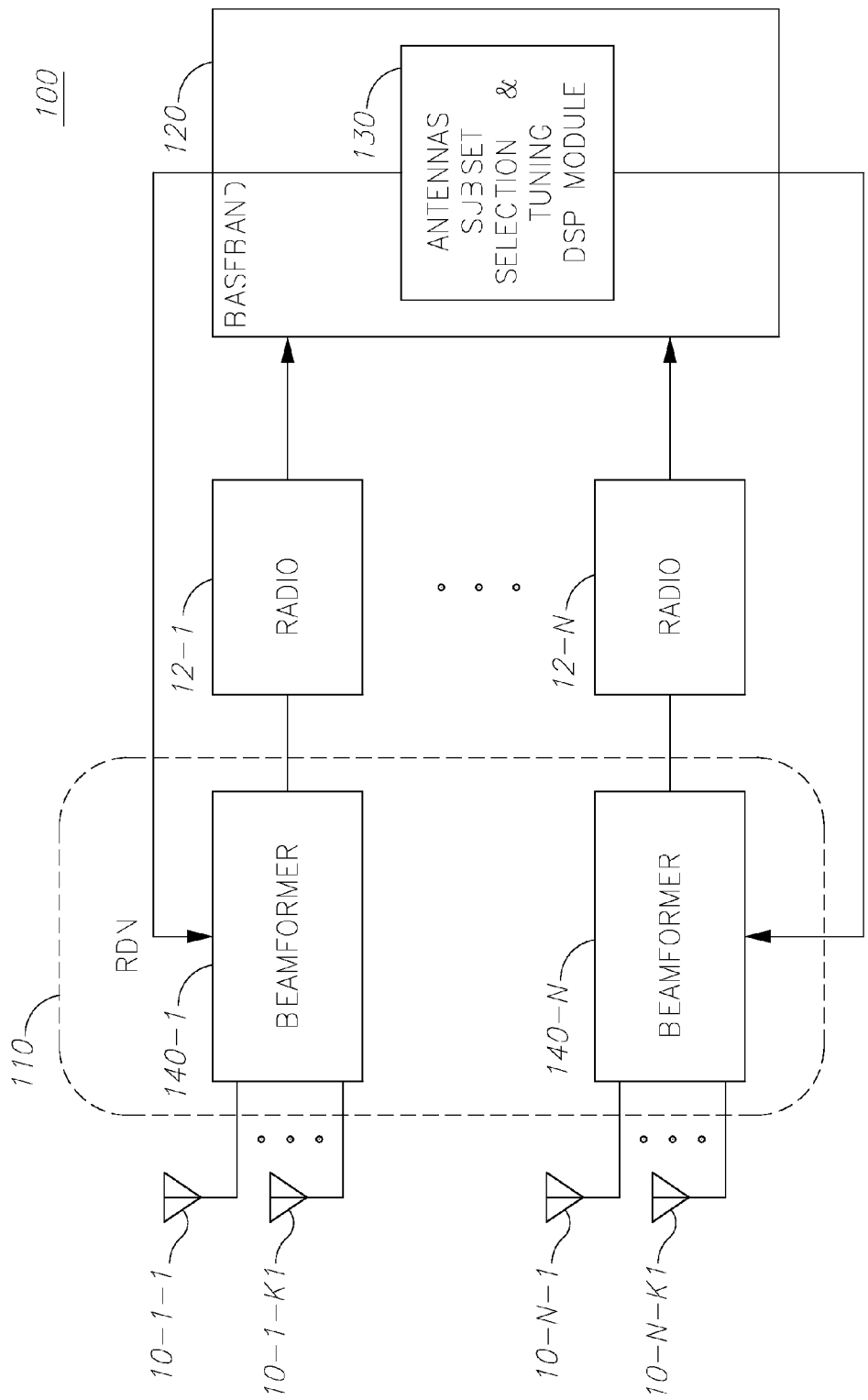
FIG. 1 is a high level block diagram illustrating a system according to some embodiments of the present invention.

The drawings together with the following detailed description make the embodiments of the invention apparent to those skilled in the art.

DETAILED DESCRIPTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

FIG. 1 is a high level block diagram illustrating a system according to embodiments of the present invention. System 100 is a MIMO receiving system in a hybrid MIMO RDN configuration. In the hybrid MIMO RDN configuration, baseband module 120 receives N branches and is configured to operate, on the baseband level, in accordance with any known or legacy MIMO receiving scheme. System 100 further includes a radio distribution network 110 (RDN) connected to baseband module 120 via radio circuits 12-1 to 12-N. RDN 110 includes at least one beamformer with antenna amplification or attenuation functionality such as 140-1 and 140-N, being fed by two or more antennas such as 10-1-1 to 10-1-$K_1$ through 10-N-1 to 10-N-$K_N$, so that a total number of antennas in system 100 is M=$K_1$+$K_2$+ . . . +$K_N$, wherein M is greater than N. Additionally, each one of the beamformers includes a combiner (not shown here) configured to combine signals coming from the antennas into a single combined signal converted to baseband by radio module 12-1 to 12-N. Baseband module 120 is configured, among other things, to tune RDN 110, for example by adjusting phase shifters located within beamformers 140-1 to 140-N. System 100 further includes antenna subset selection and tuning module 130.

In operation, antenna subset selection and tuning module 130 iteratively selects specific subset L of the K antennas on each one of the N beamformers, based on quality indicators being a subset of the best performing antennas from each group of antennas such as 10-1-1 to 10-1-$K_1$ through 10-N-1 to 10-N-$K_N$. The quality indicator may be, for example, a respective contribution to the total data rate of the antennas. It then applies a blind algorithm while constantly monitoring the fading rate change and adjusting the number of antennas participating in the blind algorithm accordingly.

Figure 2:
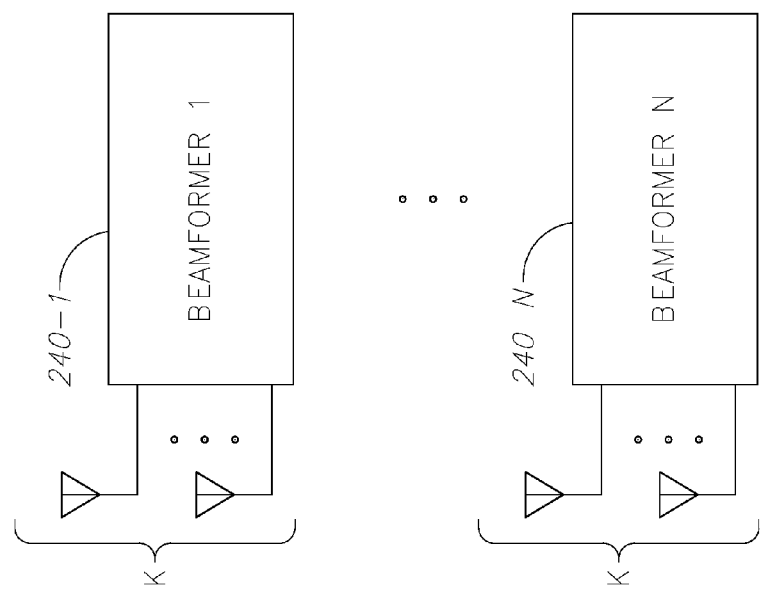
FIG. 2 is a block diagram illustrating a an aspect according to embodiments of the present invention.

FIG. 2 is a block diagram illustrating an aspect according to some embodiments of the present invention. The diagram provides a partial view of a hybrid MIMO RDN receiving system 200 that includes N beamformers 240-1 to 240-N. As can be seen, each beamformer is fed by K antennas. During the aforementioned selection process, a subset of L antennas is selected for participating in the blind algorithm process which involves iterative tuning of the antennas as will be explained below.

Figure 3:
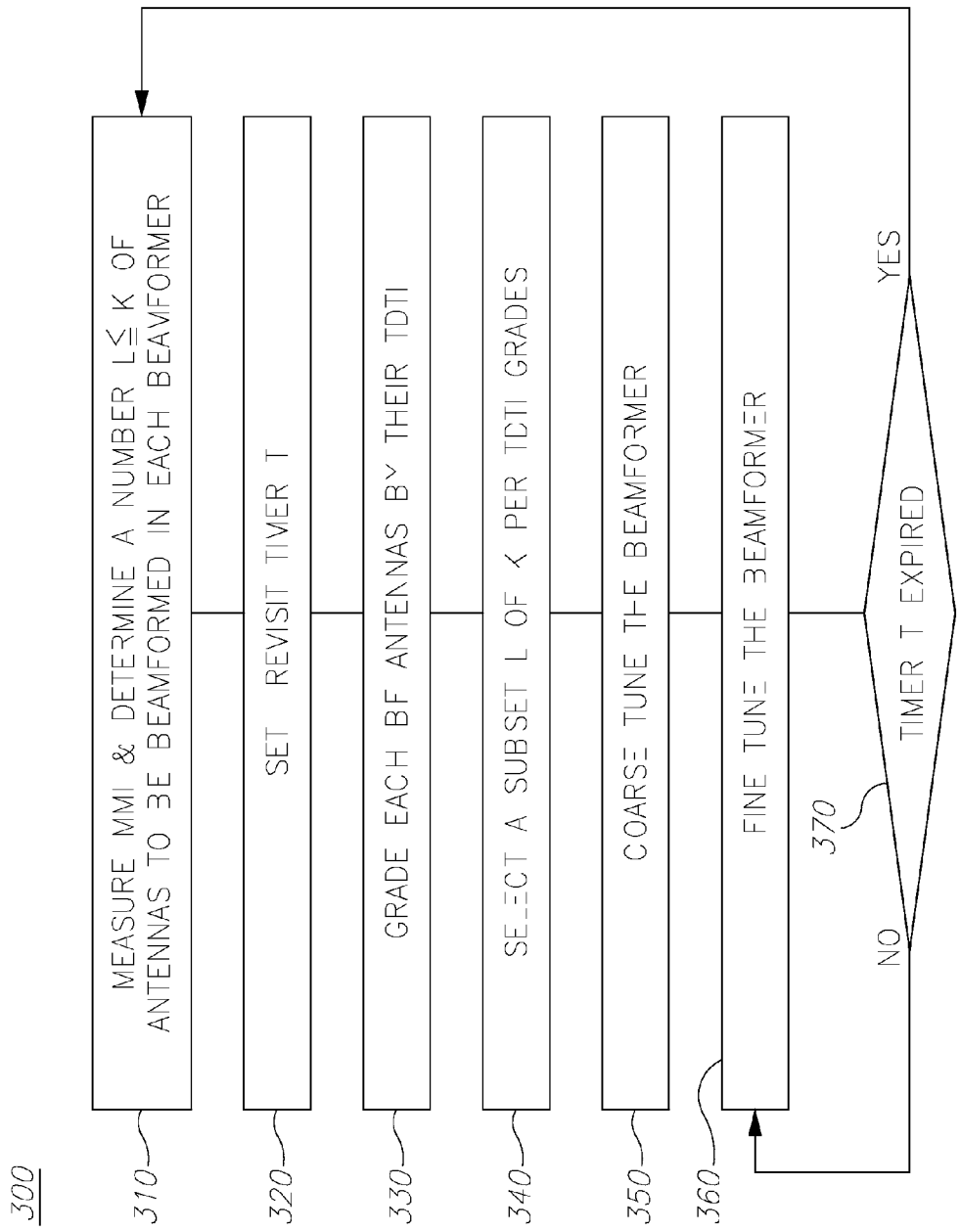
FIG. 3 is a flowchart diagram illustrating the blind search process with antenna subset selection according to embodiments of the present invention.

FIG. 3 is a flowchart diagram illustrating the blind search process with antenna subset selection according to embodiments of the present invention. Process 300 begins with step 310 where it measures Mobility Monitoring Indicators (MMI). Step 320 sets a revisit time T, being the time after which the channel may no longer be regarded as having the same characteristics so that the blind tuning process needs to be restarted from step 310. Then, process 300 goes to step 330 of grading each antenna by their Total Data Throughput Indicator (TDTI) using subroutine 300 so that grading each one of the K antennas, is based on their total data throughput coming from various data streams and wherein the selecting of said specific subset L is based on the total data throughput grades of the K antennas. The method then goes to step 340 for selecting the number of L antennas to participate in the beamforming that is predicted to require tuning process period short enough to fit into a quasi-static assumption associated with a given MMI value. L is a subset of antennas from K which is the number of the antennas on each beamformer. The TDTI is measured for each one of the K antennas and the L antennas with the highest TDTI are selected for the beamformer. After L antennas are selected, a beamforming coarse tuning algorithm is carried out in step 350. Next, step 360 executes fine tuning of the beamformer by subroutine 600 of FIG. 6 and goes to step 370. Step 370 goes to step 360 for continuing fine tuning if Timer T is not expired. Otherwise, step 370 will go to step 310 for measuring MMI again.

In some embodiments, the sub process in step 310 may start off with a continuous monitoring of MMI which may be performed by the receiver, e.g. by measuring Doppler, or measuring Pilot strength change rate, or other receiver quality indicators, providing a lookup table that is used to map estimated fading rate change or MMI into preferred number L out of K antennas used for beamforming.

Thus, the quality indicators are derivable from the lookup table. The lookup table will use a Mobility Monitor Indicator MMI, which will have several ranges as follows:

For 0>MMI>THRSH 1 boundaries of Static

For THRESH 1>MMI>THRSH 2 boundaries of Pedestrian

For THRESH k>MMI>THRSH k+1 boundaries vehicular k

The criterion for selecting a given antenna out of the K possible into the subset L for a given beamformer is TDTI for each antenna. Therefore, from time to time all antennas, the ones currently used in the subset, as well as the ones that are not, will be graded. Consequently, antennas selected for the subset will be the best L antennas, in terms of TDTI, out of K in each one of the N beamformers.

Figure 4:
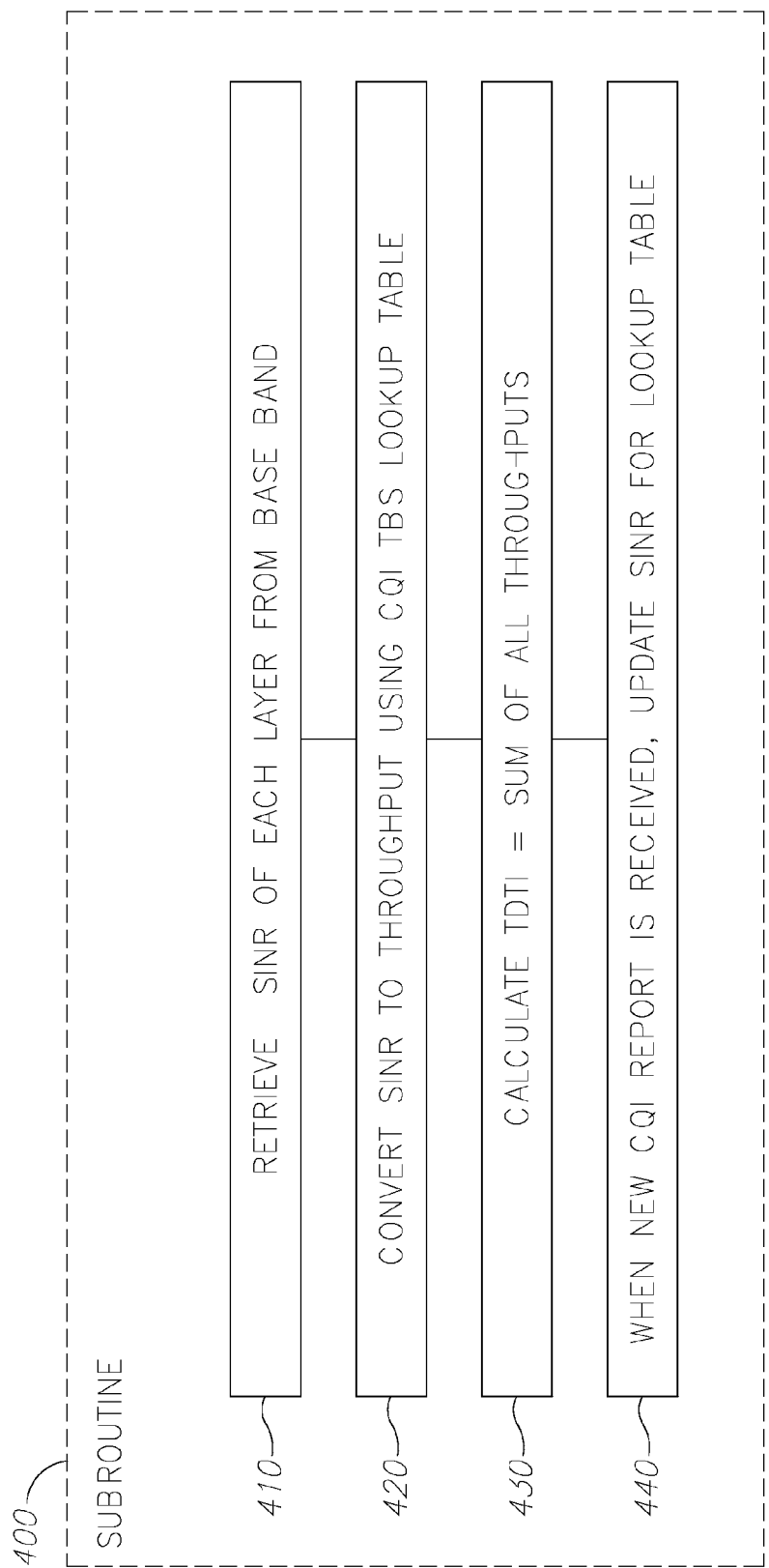
FIG. 4 is a flowchart diagram illustrating a subroutine to calculate Total Data Throughput Indicator (TDTI) according to some embodiments of the present invention.

FIG. 4 is a flowchart diagram illustrating a subroutine 400 to calculate TDTI according to some embodiments of the present invention. Process 410 retrieves SINR for each layer from the baseband processor. Then, process 420 converts SINR to throughput indicator using CQI_TBS lookup table. One example of an embodiment for estimating total data throughput by SINRs and a CQI_TBS lookup table is described next. For the downlink data transmissions, the NodeB typically selects the modulation scheme and code rate depending on the Channel Quality Indicator (CQI) feedback transmitted by the User Equipment (UE) in the uplink. The reported CQI is not a direct indication of SINR. Instead, the UE reports the highest MCS (Modulation and Coding Scheme) that it can decode with a transport block error rate probability not exceeding 10% taking into account both the characteristics of the UE's receiver and radio channel quality. In LTE SU-MIMO spatial multiplexing scheme, at most two codewords are used, even if four layers are transmitted. Only one CQI and HARQ ACK/NACK feedback reporting is needed for all layers in one codeword, since all RBs belonging to the same codeword use the same MCS, even if a codeword is mapped to multiple layers. Process 430 calculates the TDTI based on SINRs and the CQI_TBS table by the following formula.

$$TDTI = \sum_{i=1}^{N_d} TBS(SINR_i),$$

for $N_d$ data streams, where $TBS(SINR_i)$ can be calculated by the floor function or by interpolation between two SINR entries in the table. Then, process 440 updates SINRs entries corresponding CQI in the lookup table when UE reports CQI feedback to NodeB. According to some embodiments, the SINR conversion in the lookup table is updated in a case a new CQI report arrives.

TABLE 1

CQI_TBS Lookup Table

| CQI Index | Modulation | MCS | TBS | 1st Codeword SINR (dB) | 2nd Codeword SINR (dB) |
|---|---|---|---|---|---|
| 0 | | | | | |
| 1 | QPSK | 0 | 536 | 2.0 | 1.5 |
| 2 | QPSK | 0 | 536 | 3.9 | 3.4 |
| 3 | QPSK | 2 | 872 | 5.9 | 5.4 |
| 4 | QPSK | 5 | 1736 | 7.8 | 7.3 |
| 5 | QPSK | 7 | 2417 | 9.7 | 9.2 |
| 6 | QPSK | 9 | 3112 | 11.6 | 11.1 |
| 7 | 16QAM | 12 | 4008 | 13.6 | 13.1 |
| 8 | 16QAM | 14 | 5160 | 15.5 | 15.0 |
| 9 | 16QAM | 16 | 6200 | 17.4 | 16.9 |
| 10 | 64QAM | 20 | 7992 | 19.4 | 18.9 |
| 11 | 64QAM | 23 | 9912 | 21.3 | 20.8 |
| 12 | 64QAM | 25 | 11448 | 23.2 | 22.7 |
| 13 | 64QAM | 27 | 12576 | 25.1 | 24.6 |
| 14 | 64QAM | 28 | 14688 | 27.1 | 26.6 |
| 15 | 64QAM | 28 | 14688 | 29.0 | 28.5 |

Figure 5:
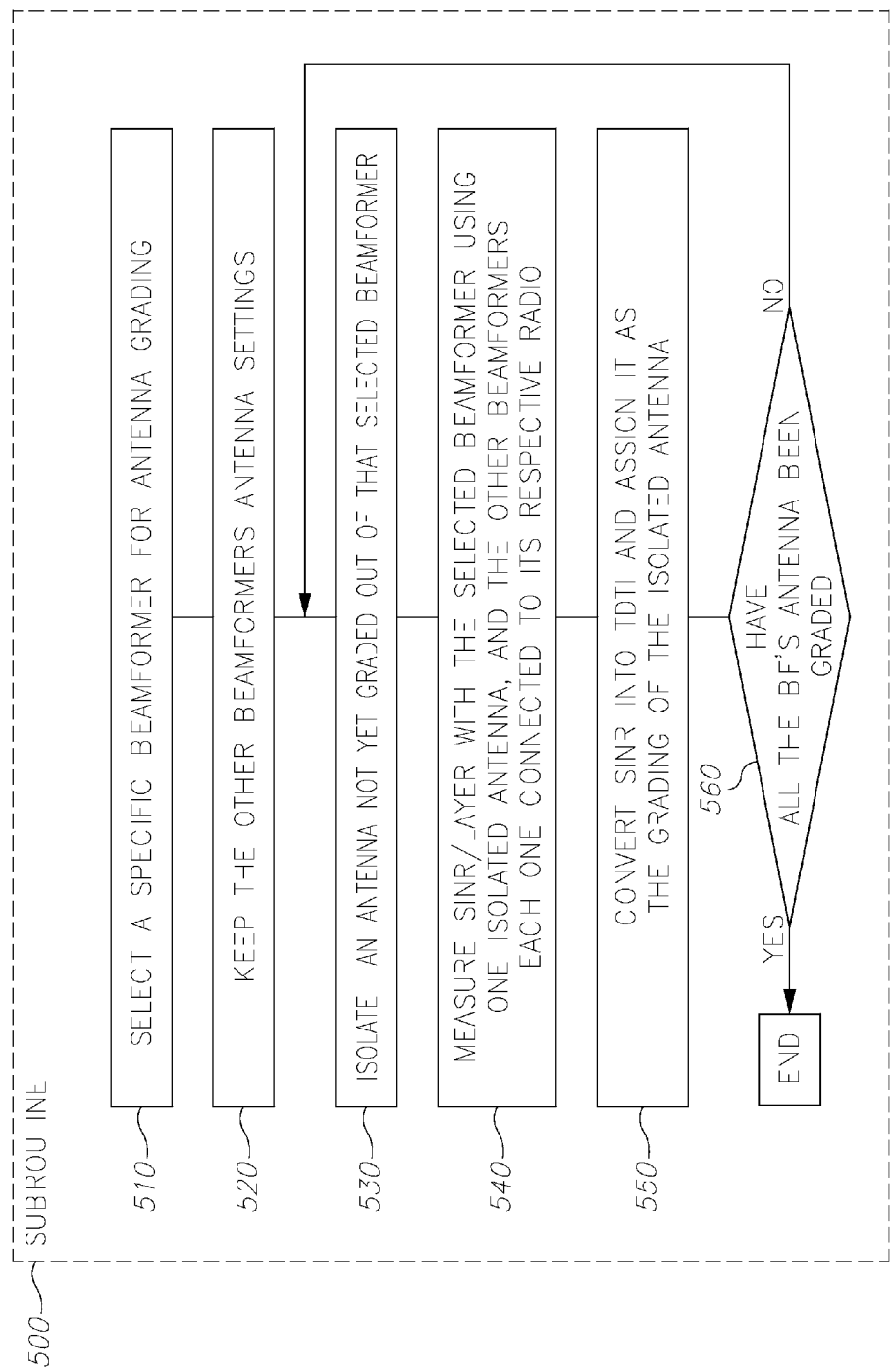
FIG. 5 is a flowchart diagram illustrating a subroutine for antennas grading according to embodiments of the present invention.

FIG. 5 is a flowchart diagram illustrating a subroutine for antenna grading according to embodiments of the present invention. Subroutine 500 starts with selecting a specific beamformer for antenna grading at step 510. Then, step 520 keeps the other beamformers connected with the same settings using K or less antennas throughout the antenna grading subroutine for the selected beamformer. Intuitively, the other beamformers can provide beamforming gain, reduce overall noise of received signals and improve grading accuracy of the selected beamformer. Step 530 isolates the next antenna in the selected beamformer for grading. Next, step 540 measures SINR per layer with the selected beamformer using the isolated antenna and the other beamformers using K or less antennas as configured by step 520. All beamformers are connected to their respective radios. Step 550 calculates TDTI from the measured SINRs using CQI_TBL lookup table, and the TDTI is then assigned as the grade of the isolated antenna. Finally, step 560 exits if all antennas of the selected beamformer have been graded. Otherwise, it goes back to step 530 for grading the next antenna.

The effect of beamforming on reducing noise of received signals can be illustrated by the following example. Let X be a matrix denoting signals being transmitted and H denote the channel matrix modeling the propagation. Then the signals received by the receiver can be written as $Y=HWX+N$, where N is the additive noise matrix and W is the weights matrix.

For 2×2 channels, the matrices can be noted as $$Y = \begin{bmatrix} y_1 \\ y_2 \end{bmatrix}, H = \begin{bmatrix} h_{11} & h_{12} \\ h_{21} & h_{22} \end{bmatrix}, W = \begin{bmatrix} k_1 & 0 \\ 0 & k_2 \end{bmatrix}, X = \begin{bmatrix} x_1 \\ x_2 \end{bmatrix}, N = \begin{bmatrix} n_1 \\ n_2 \end{bmatrix},$$

then Y=HWX+N can be written as $$\begin{bmatrix} y_1 \\ y_2 \end{bmatrix} = \begin{bmatrix} h_{11} & h_{12} \\ h_{21} & h_{22} \end{bmatrix} \begin{bmatrix} k_1 & 0 \\ 0 & k_2 \end{bmatrix} \begin{bmatrix} x_1 \\ x_2 \end{bmatrix} + \begin{bmatrix} n_1 \\ n_2 \end{bmatrix}$$

Assuming that the receiver has the knowledge of H and W, the transmitted signals can be recovered as:

$$\hat{X} = (HW)^{-1} Y = (HW)^{-1}(HWX + N) = X + (WH)^{-1}N, \text{ where}$$

$$H^{-1} = \frac{1}{h_{11}h_{22} - h_{12}h_{21}} \begin{bmatrix} h_{22} & -h_{12} \\ -h_{21} & h_{11} \end{bmatrix} = \begin{bmatrix} a & b \\ c & d \end{bmatrix}, W^{-1} = \begin{bmatrix} \frac{1}{k_1} & 0 \\ 0 & \frac{1}{k_2} \end{bmatrix}$$

The error of recovered signals can be derived as $$E = \begin{bmatrix} e_1 \\ e_2 \end{bmatrix} = \hat{X} - X = W^{-1}H^{-1}N = \begin{bmatrix} \frac{an_1 + bn_2}{k_1} \\ \frac{cn_1 + dn_2}{k_2} \end{bmatrix}$$

If channels from transmitter 1 and transmitter 2 are improved by a factor of $k_1$ and $k_2$ respectively (i.e., $k_1 > 1$ and $k_2 > 1$), then the error for $x_1$ and $x_2$ are reduced by a factor of $1/k_1$ and $1/k_2$.

Figure 6:
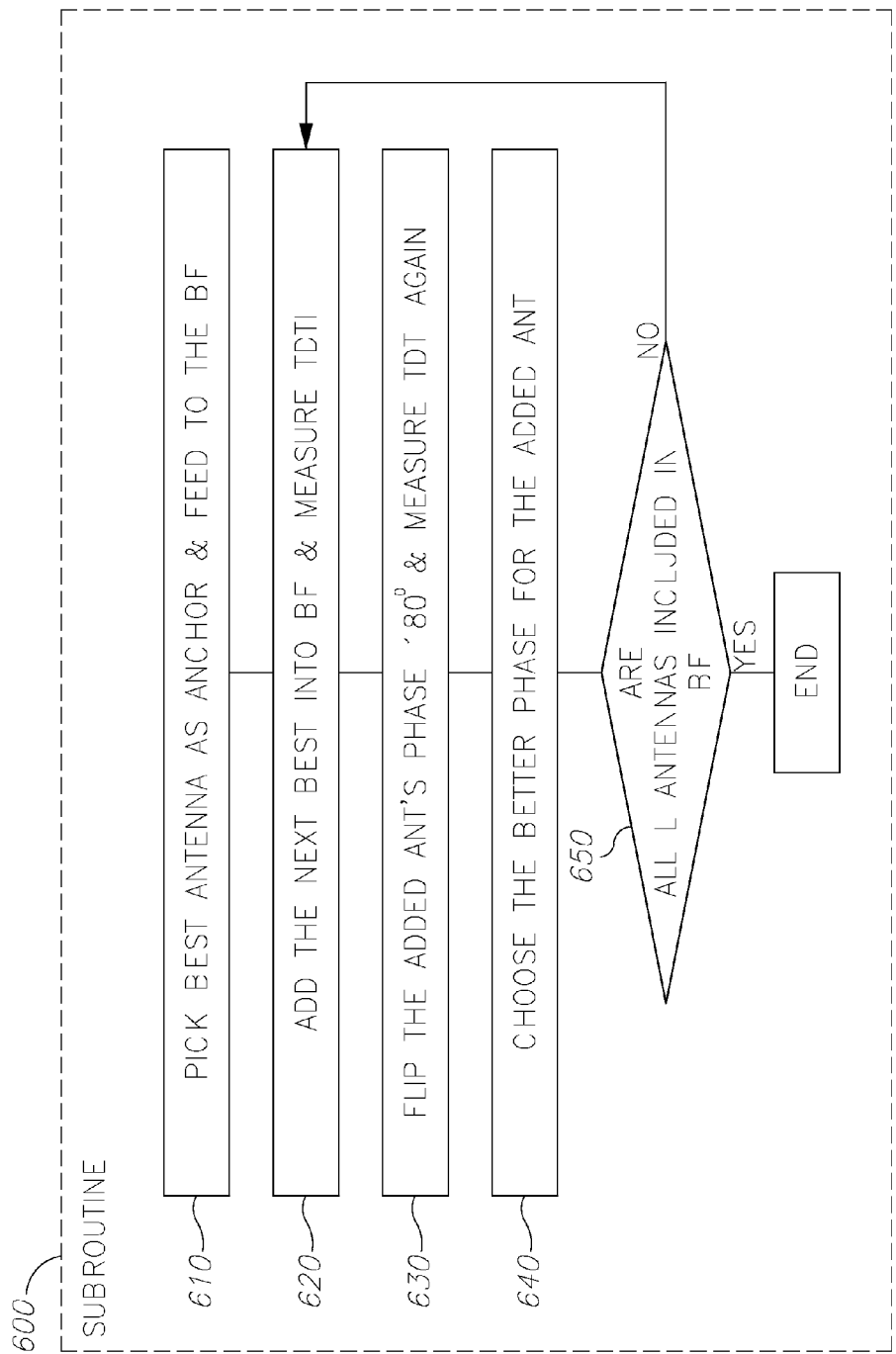
FIG. 6 is a flowchart diagram illustrating a subroutine for coarse blind tuning according to embodiments of the present invention.

FIG. 6 is a flowchart diagram illustrating a subroutine for a round of coarse blind tuning for a beamformer according to an exemplary embodiment of the present invention. Subroutine 600 begins with step 610 where it picks the best antenna among L selected antennas to participate in the beamformer according to its grade determined by the antenna grading subroutine 500. Step 620 adds the next best antenna into beamformer and measures TDTI using TDTI calculation routine as described in FIG. 4. Then, step 630 changes (or 'flips') the added antenna's phase by 180° and measures TDTI again. Next, step 640 chooses the better phase for the added antenna. Finally, step 650 goes to step 620 for adding next antenna until all L selected antennas have been included for the beamformer. During coarse blind tuning of the beamformer, more phases may be tested instead of just two phases, 0° and 180° as depicted in steps 630 and 640. For example, 0°, 120° and 240° may be used.

Figure 7:
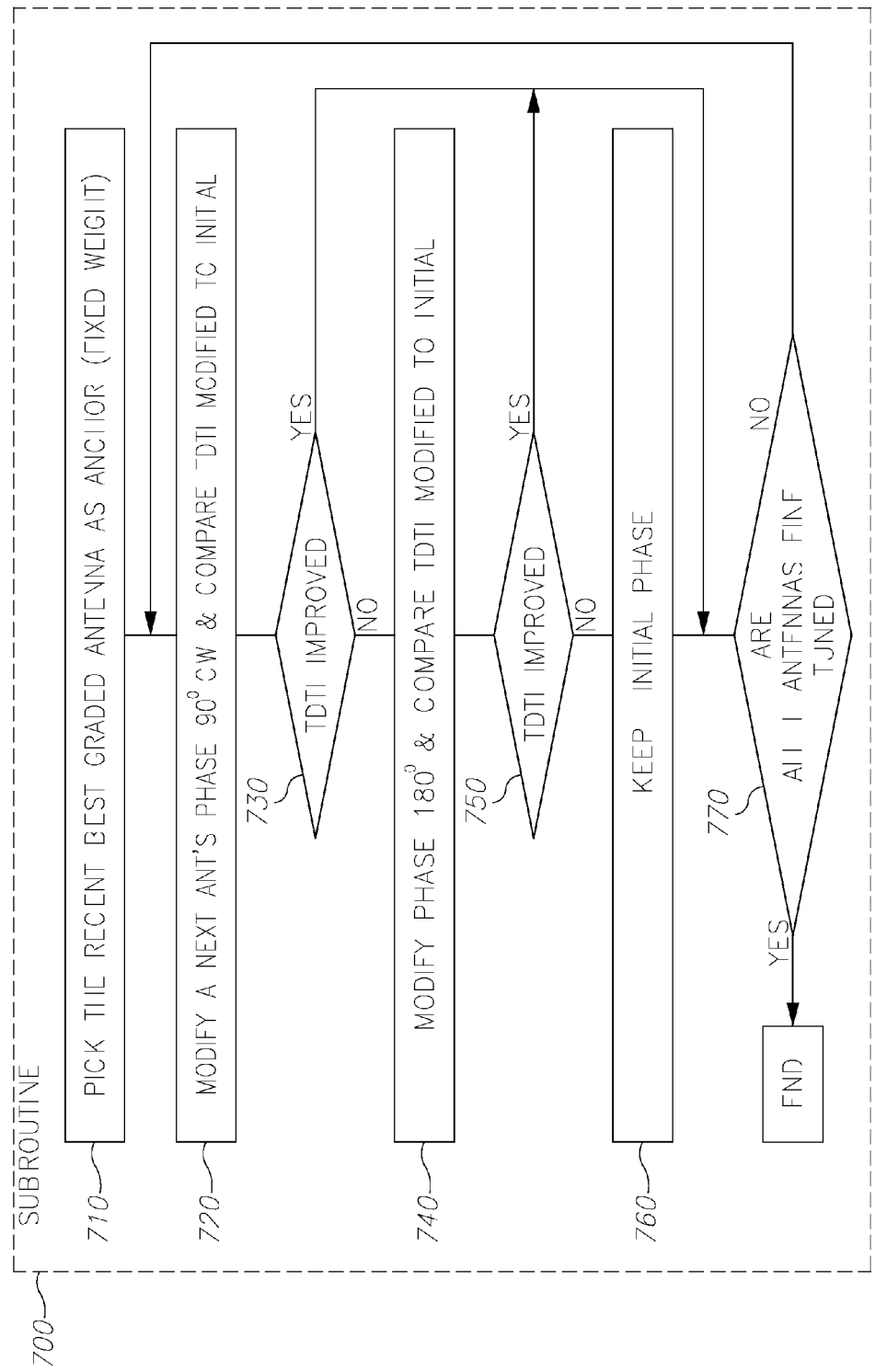
FIG. 7 is a flowchart diagram illustrating a subroutine for fine blind tuning according to embodiments of the present invention.

FIG. 7 is a flowchart diagram illustrating a subroutine for fine blind tuning according to an exemplary embodiment of the present invention. All selected antennas stay connected to the beamformer during the fine tuning process. Subroutine 700 begins with step 710 where it picks the best antenna among L selected antennas in the beamformer according to its grade determined by the antenna grading subroutine 500. Step 720 modifies the next best antenna's initial phase by about 90° on one direction (e.g., clockwise) and compares TDTI of modified to initial phase. Then, step 730 keeps the new phase and goes to step 770 if TDTI improves. Otherwise, it goes to next step 740. Step 740 modifies the next best antenna's phase by 180° to the other direction (e.g. counter clockwise) and compares TDTI of modified to initial phase. Then, step 750 keeps the new phase and goes to step 770 if TDTI improves. Otherwise, it goes to next step 760 to keep the original phase. Finally, step 770 goes to step 720 for fine tuning the next antenna until all L selected antennas have been fine tuned. During fine blind tuning of a selected antenna, other finer than 90° phase resolution may be tested. For example, 45° or 60° may be used.

Figure 8:
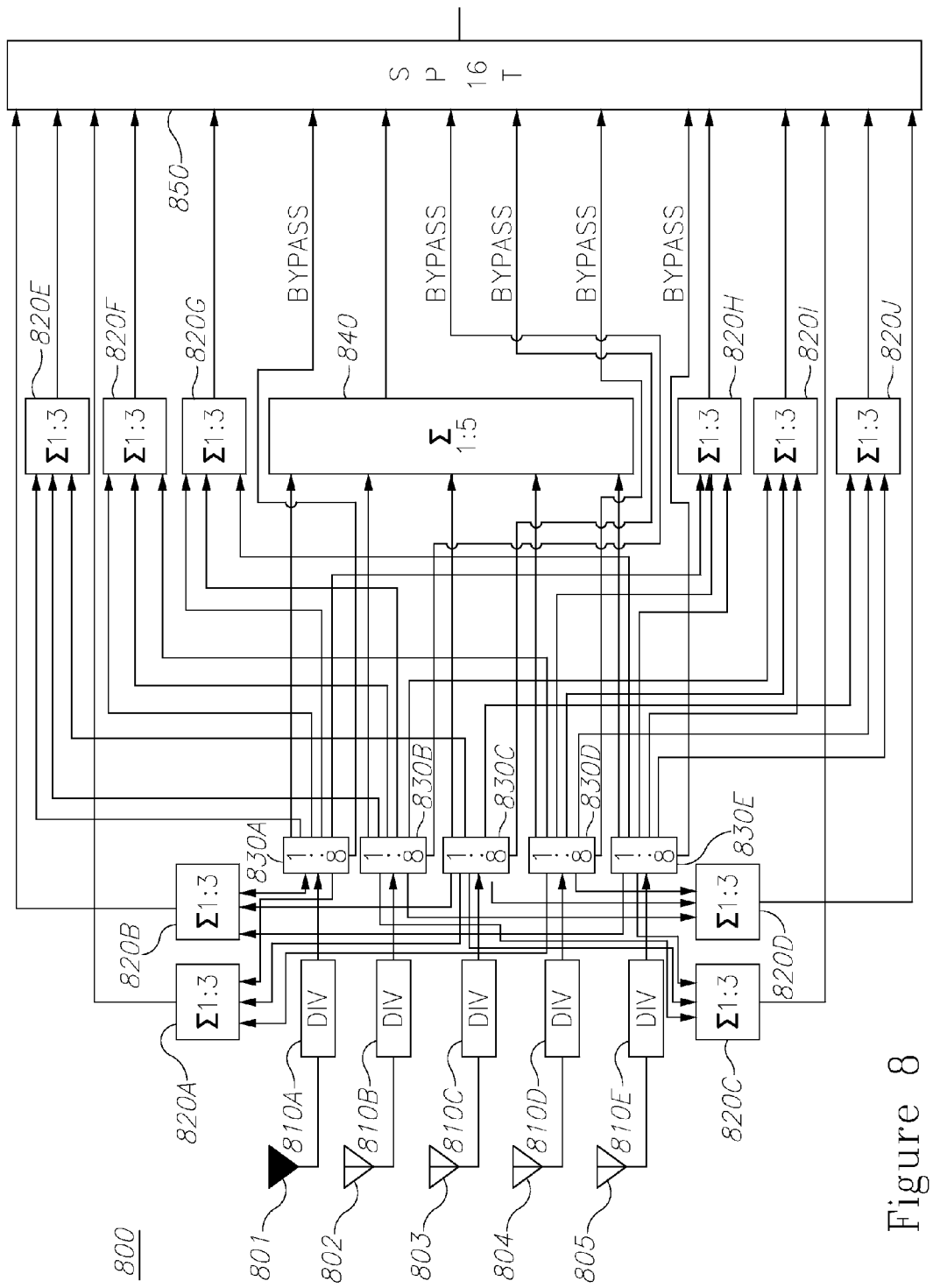
FIGS. 8 and 9 are circuit diagrams illustrating exemplary implementations of the system according to embodiments of the present invention.
Figure 9:
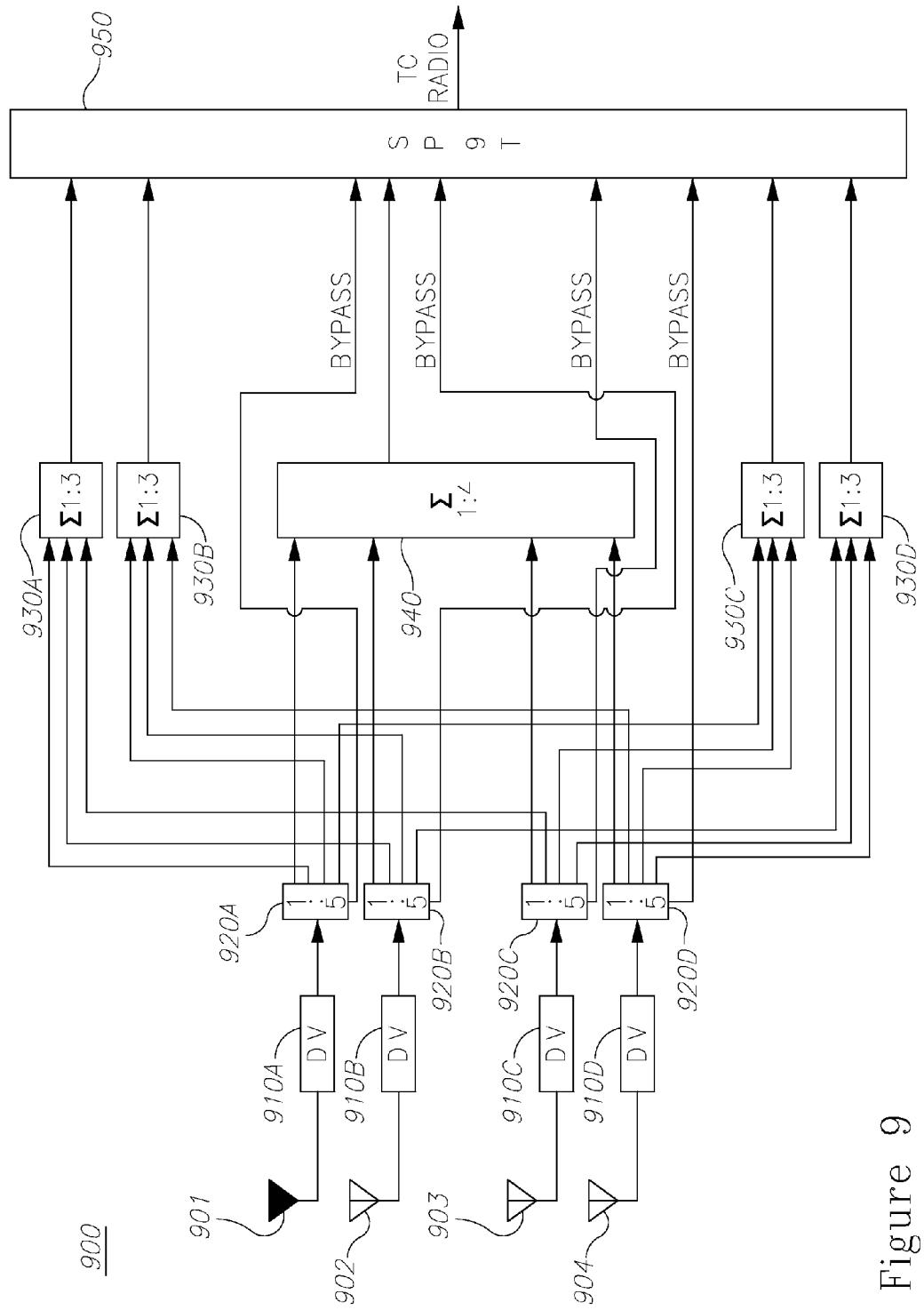

FIG. 8 and FIG. 9 are circuit diagrams illustrating exemplary implementations of the system according to embodiments of the present invention. Specifically, exemplary implementations of the beamformers operate in cooperation with antenna subset selection module 130. As opposed to the preferred implementation for RDN that use Channel Estimation for tuning, the Blind algorithm RDN implementation will have phase tuning for all antennas, including the MAIN. As opposed to the implementation for RDN that use Channel Estimation for tuning, the Blind RDN tuning implementation will have a set of N−1 combiners, allowing for combining only 2 antennas or only 3 antennas etc., to be selected per the measured fading rate change or MMI. As opposed to the preferred implementation for RDN that use Channel Estimation for tuning, the Blind Tuning RDN implementation will have pooling scheme allowing selecting a number of antennas for combining.

FIG. 8 depicts an example of five antennas 801 to 805, each connected to a diversity module 810A to 810E where the diversity module controls phase and amplitude. The diversity modules are feeding 1:8 selectors 830A to 830E that are feeding a 1:5 RF combiner 840. The 1:8 selectors are also feeding three-way combiners 820A to 820J so that various triplets of antennas can be combined. A sixteen-way selector 850 selects alternative combiners including the single 1:5 combiner and the ten 1:3 combiners. Consequently, any three antennas out of five can be combined and selected as the input of a radio, as well as all five antennas combined. As shown in FIG. 8, the circuit is capable of isolating each antenna by routing the "bypass" signals from the antennas. In general and in this example, the grading of each one of the K antennas may be carried out by a process that includes isolating a given antenna and registering the reported signal to noise plus interference ratio (SINR) of each layer; converting each SINR to CQI and then to Data Rate via said lookup table; and summing them up to provide TDTI grading, while said process is carried out with K or less antennas at the other beamformers.

FIG. 9 depicts an example of four antennas 901 to 904, each connected to a diversity module 910A to 910D. The diversity modules are feeding 1:5 selectors 920A to 920D that are feeding a 1:4 RF combiner 940. The 1:5 selectors are also feeding three-way combiners 930A to 930D so that various triplets of antennas can be combined. A nine-way selector 950 selects alternative combiners including the single 1:4 combiner and the four 1:3 combiners. Consequently, any three antennas out of four can be selected as inputs of a radio, as well as all four antennas combined.

FIG. 10 is a high level flowchart illustrating a method 1000 according to some embodiment of the present invention. It should be understood that method 1000 is not limited to an implementation using the aforementioned exemplary architecture discussed above. Method 1000 may include the following stages: receiving multiple input multiple output (MIMO) radio frequency (RF) signals through M antennas coupled via N beamformers to a MIMO receiving system having N channels, wherein M>N 1010; measuring channel fading rate at a baseband level 1020; determining a number of antennas L to be combined out of K antennas of each one of the N beamformers, based on the measured fading rate 1030; and repeatedly or iteratively applying a tuning process to L antennas at each of the N beamformers 1040, wherein the repeated tuning ends when all L antennas are tuned but preferably before the channel fading rate has been changed.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. A method comprising:
    receiving multiple input multiple output (MIMO) radio frequency (RF) signals through M antennas coupled via N beamformers to a MIMO receiving system having N channels, wherein M>N;
    measuring channel fading rate at a baseband level;
    grading each one of K antennas of each one of the N beamformers based on their total data throughput coming from various data streams,
    wherein the total data throughput is represented by a total data throughput indicator (TDTI) derivable via a lookup table based on a channel quality indicator (CQI) criterion and measured signal to noise plus interference ratio (SINR);
    determining a number of antennas L to be combined out of the K antennas, based on the measured fading rate, wherein the subset of L antennas is based on the total data throughput grades of the K antennas; and
    repeatedly applying a tuning process to L antennas at each of the N beamformers.

2. The method according to claim 1, wherein the channel fading rate is represented by measuring a mobility monitoring indicator (MMI).

3. A method comprising:
    receiving multiple input multiple output (MIMO) radio frequency (RF) signals through M antennas coupled via N beamformers to a MIMO receiving system having N channels, wherein M>N;

measuring channel fading rate at a baseband level:
grading each one of K antennas of each one of the N beamformers based on their total data throughput coming from various data streams, wherein the grading is carried out by a process comprising:
  isolating a given antenna and registering the reported signal to noise plus interference ratio (SINR) of each layer,
  converting each SINR to channel quality indicator (CQI) and then to Data Rate via a lookup table, and
  summing them up to provide total data throughput indicator (TDTI) grading, while said process is carried out with K or less antennas at the other beamformers;
determining a number of antennas L to be combined out of the K antennas, based on the measured fading rate, wherein the subset of L antennas is based on the total data throughput grades of the K antennas; and
repeatedly applying a tuning process to L antennas at each of the N beamformers.

4. The method according to claim 3, further comprising a step of updating the SINR conversion in the lookup table in a case a new CQI report arrives.

5. The method according to claim 3, wherein the channel fading rate is represented by measuring a mobility monitoring indicator (MMI).

6. A method comprising:
receiving multiple input multiple output (MIMO) radio frequency (RF) signals through M antennas coupled via N beamformers to a MIMO receiving system having N channels, wherein M>N;
measuring channel fading rate at a baseband level;
determining a number of antennas L to be combined out of K antennas of each one of the N beamformers, based on the measured fading rate; and
repeatedly applying a tuning process to L antennas at each of the N beamformers,
  wherein said tuning process includes at least one round of coarse tuning process,
  wherein the coarse tuning process comprises:
    selecting best graded antenna as an anchor;
    combining the anchor with the second best graded antenna and measure Total Data Throughput Indicator (TDTI);
    flipping the phase of the second best antenna by approximately 180°, and measuring the TDTI;
    choosing the better TDTI as preferred coarse phase;
    combining the next best graded antenna with the previously combined antennas and measure the TDTI;
    flipping the phase of the next best graded antenna and measure TDTI, and selecting the better one; and
    repeating the adding of antennas to the combiner per their grading until all L antennas are added.

7. The method according to claim 6, wherein said tuning process includes a fine tuning process.

8. A system comprising:
M antennas;
N beamformers connected to the M antennas;
a multiple input multiple output (MIMO) receiving system having N channels, connected to the N beamformers, wherein M>N; and
an antenna subset selection and tuning module configured to:
  measure channel fading rate at a baseband level;
  grade each one of K antennas, based on their total data throughput coming from various data streams, wherein K is a number of antennas connected to each one of the beamformers and wherein the total data throughput is represented by a total data throughput indicator (TDTI) derivable via a lookup table based on a channel quality indicator (CQI) criterion and measured signal to noise plus interference ratio (SINR);
  determine a number of antennas L≤K to be combined at each one of the N beamformers, based on the measured fading rate and the total data throughput grades of the K antennas; and
  repeatedly apply a tuning process to L antennas at each of the N beamformers.

9. The system according to claim 8, wherein the channel fading rate is represented by measuring a mobility monitoring indicator (MMI).

10. A system comprising:
M antennas;
N beamformers connected to the M antennas;
a multiple input multiple output (MIMO) receiving system having N channels, connected to the N beamformers, wherein M>N; and
an antenna subset selection and tuning module configured to:
  measure channel fading rate at a baseband level;
  grade each one of K antennas, based on their total data throughput coming from various data streams, wherein K is a number of antennas connected to each one of the beamformers and wherein the grading of each one of the K antennas is carried out by a process comprising:
    isolating a given antenna and registering the reported signal to noise plus interference ratio (SINR) of each layer;
    converting each SINR to CQI and then to Data Rate via a lookup table; and
    summing them up to provide TDTI grading, while said process is carried out with K or less antennas at the other beamformers;
  determine a number of antennas L<K to be combined at each one of the N beamformers, based on the measured fading rate and the total data throughput grades of the K antennas; and
  repeatedly apply a tuning process to L antennas at each of the N beamformers.

11. The system according to claim 10, wherein the antenna subset selection and tuning module is further configured to update the SINR conversion in the lookup table in a case a new CQI report arrives.

12. The system according to claim 10, wherein the channel fading rate is represented by measuring a mobility monitoring indicator (MMI).

13. A system comprising:
M antennas;
N beamformers connected to the M antennas;
a multiple input multiple output (MIMO) receiving system having N channels, connected to the N beamformers, wherein M>N; and
an antenna subset selection and tuning module configured to:
  measure channel fading rate at a baseband level;
  determine a number of antennas L≤K to be combined at each one of the N beamformers, wherein K is a number of antennas connected to each one of the beamformers, based on the measured fading rate; and
  repeatedly apply a tuning process to L antennas at each of the N beamformers, wherein said tuning process includes at least one round of coarse tuning process, wherein the coarse tuning process comprises:

selecting best graded antenna as an anchor;

combining the anchor with the second best graded antenna and measure total data throughput indicator (TDTI);

flipping the phase of the second best antenna approximately 180°, and measuring the TDTI;

choosing the better TDTI as preferred coarse phase;

combining the next best graded antenna with the previously combined antennas and measure the TDTI;

flipping the phase of the next best graded antenna and measure TDTI, and select the better one; and repeating the adding of antennas to the combiner per their grading till all L antennas are added.

14. The system according to claim 13, wherein said tuning process includes a fine tuning process.

* * * * *